Jan. 21, 1969     A. HEINS     3,423,270
ADHESIVE COMPOSITION AND PROCESS FOR ADHESIVELY
JOINING ELASTOMERS TO METALS
Filed Oct. 24, 1962
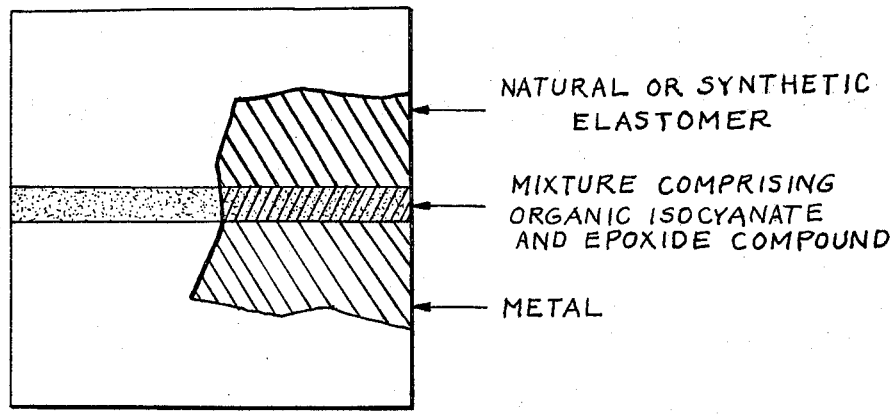
INVENTOR.
ARNOLD HEINS
BY
ATTORNEYS

United States Patent Office

3,423,270
Patented Jan. 21, 1969

3,423,270
ADHESIVE COMPOSITION AND PROCESS
FOR ADHESIVELY JOINING ELASTO-
MERS TO METALS
Arnold Heins, Hilden, Rhineland, Germany, assignor to
Henkel & Cie, G.m.b.H., Dusseldorf-Holthausen, Germany, a corporation of Germany
Filed Oct. 24, 1962, Ser. No. 232,882
Claims priority, application Germany, Nov. 2, 1961,
H 44,027
U.S. Cl. 156—330    10 Claims
Int. Cl. B32b 15/08; C09j 3/16

ABSTRACT OF THE DISCLOSURE

Compositions for forming adhesive bonds between elastomers and metals consisting of (1) an organic polyisocyanate, and (2) an aliphatic or aliphatic-aromatic epoxide compound having more than one epoxide group and an aliphatic chain of at least 8 carbon atoms; as well as the method of forming adhesive bonds between elastomers and metals.

---

This application relates to a process for forming an adhesive bond between natural or synthetic elastomers and solid materials, especially metals. It is well known that the formation of an adhesive bond between highly elastic and rigid objects presents special problems, and only relatively few adhesives have heretofore been discovered which are well suited for this purpose.

It has previously been suggested to use mixtures of di-isocyanates and those epoxide resins which are prepared by condensation of epichlorohydrin with diphenylolpropane for producing an adhesive bond between metals or plastics with metals. When it was attempted to form an adhesive bond with such mixtures between elastomers and metals, I did not obtain satisfactory results.

I have now found that natural or synthetic elastomers can be adhesively bonded in an excellent manner with solid materials, especially with metals, when mixtures of compounds which contain more than one isocyanate group in the molecule with certain epoxide resins are used as the adhesive. Suitable epoxide resins for this purpose are those which contain either no aromatic radicals at all or in addition to aromatic rings aliphatic or cycloaliphatic radicals with at least 8 members.

A diagrammatic representation of my invention is shown in the figure.

Examples of organic isocyanates which may be employed for the adhesives according to the present invention are the following: phenylenediisocyanate, toluylenediisocyanate, diphenylmethane-4,4'-diisocyanate, diphenylene - 4,4'-diisocyanate, 3,3'-dimethoxy-4,4'-diphenylenediisocyanate (dianisidinediisocyanate), triphenylmethanetriisocyanate, tetramethylenediisocyanate, hexamethylenediisocyanate, decamethylenediisocyanate. It is preferred to employ those isocyanates in which the diisocyanate groups are attached to aromatic rings. In some instances, it is advantageous to use reaction products of isocyanates which still contain at least 2 isocyanate groups in the molecule, such as the commercial reaction product of 1 mol of trimethylolpropane and 3 mols of toluylenediisocyanate, in place of the isocyanates themselves.

It is advantageous to use those epoxide resins for the process according to the present invention which have been produced from aliphatic or cycloaliphatic di- or polycarboxylic acids with more than 3 carbon atoms or their salts by reaction with epichlorohydrin or other epihalohydrins.

These epoxy groups containing hardenable compounds can be produced in a simplified way and making usage of easily available starting materials. Organic compositions which contain more than one carboxyl group in the molecule can be brought to react at elevated temperatures with halogen epoxy alkanes which contains a halogen atom in the adjacent position to the epoxy group. In place of the carboxyl group containing compositions can also be used their anhydrides together with water and/or multivalent alcohols as starting materials for the inventive process. The halogen epoxy alkane is used in a quantity of more than 2 moles per carboxyl group, or more than 4 mols per carboxylic acid anhydride group. As catalysts are added organic high molecular compositions insoluble in the reaction mixture, which contain either (a) salt groups or
(b) groups which can convert under the reaction conditions into salt groups, or
(c) acid amide groups.

For isolation of the formed epoxide compositions the catalyst has to be separated from the reaction mixture. Thereafter, the excess halogen epoxyalkane as well as the formed volatile reaction products are distilled off.

Especially suitable are those epoxide resins which have been produced from aliphatic dicarboxylic acids with 4 to 10 carbon atoms, such as succinic acid, adipic acid, trimethyladipic acid or sebacic acid, or their salts, and epichlorohydrin, by the process of one of the above-mentioned patents.

In addition to aliphatic di- or polycarboxylic acids, the starting materials for the preparation of the epoxide resins may also be their derivatives which contain more than one free carboxyl group in the molecule, such as their acid esters with polyvalent alcohols or with hydroxycarboxylic acids. In connection herewith, it has been found that when polyesters with acid terminal groups having a molecular weight of up to 2000 are used as the starting materials, satisfactory adhesive bonds are still obtained. Suitable acid esters are produced, for example, by reaction of ethyleneglycol, diethyleneglycol, triethyleneglycol, trimethyleneglycol, or hexamethyleneglycol, with 2 mols of acids such as succinic acid, adipic acid or sebacic acid, or their anhydrides.

Other examples of suitable epoxide resins are those which are obtained from polyvalent alcohols by etherification with epichlorohydrin and subsequent cleavage of HCl according to known methods, such as butanediol-1,4-diglycide ether, butane diol-1,3-diglycide ether, hexane-diol - 1,6 - diglycide ether, decanediol-1,10-diglycide ether, octadecanediol-1,12-diglycide ether, 1,4-dimethylolcyclohexane-diglycide ether, and quinitol-diglycide ether.

It is also possible to employ epoxide resins which contain aromatic radicals. In this case, however, it is necessary that, in addition to the aromatic resins, aliphatic or cycloaliphatic radicals with at least 8 members be present in the molecule. It is not necessary that the aliphatic chains are continuous hydrocarbon chains; instead, they may also be interrupted by heteroatoms. A suitable epoxide resin which contains long aliphatic chains in addition to aromatic radicals may, for instance, be prepared by the process described above from a reaction product of 1 mol of ricinoleic acid with one mol of phthalic acid anhydride. Other examples for suitable starting materials are the acid esters produced from castor oil and phthalic acid anhydride or the reaction product of 2 mols of phthalic acid anhydride with a dimeric fatty alcohol, e.g., a dimer from fatty acids having a chain length of up to 18 carbon atoms, or more.

The most advantageous mixture ratio of the above-mentioned isocyanates and epoxide resins is present when the ratio of epoxide groups to isocyanate groups is between 1:1 and 1:5, preferably about 1:3.

The effect of the adhesives according to the present invention can be further improved if fillers with a large exterior surface are added, such as carbon black, preferably in an amount of about 1 to 10%. In this manner the resistance against peeling of the rubber-metal adhesive bonds is considerably improved.

I have found that a further improvement of the adhesive bonds produced with the mixtures according to the present invention can be achieved by the addition of about 1 to 10%, preferably 2 to 5%, of maleic acid.

The adhesive mixture according to the present invention is employed as such or in the form of solutions. The solvents for such solutions may be inert organic solvents, such as toluene, xylene, methylene chloride, dioxane, acetone, methylethyl ketone, cyclohexanone, and the like.

The adhesive mixtures according to the present invention are employed by applying the adhesive to the surfaces to be bonded and then pressing one surface against the other with a slight pressure, possibly after allowing the solvent to evaporate. Subsequently, the hardening of the adhesive takes place, preferably at an elevated temperature between about 60 and 180° C., especially at 120 to 160° C. The hardening time depends, inter alia, upon the temperature which is applied. Depending upon the composition of the adhesive mixture, it may amount to about 10 to 30 minutes at a hardening temperature of 160° C.

The applicant has further determined that the hardening of the adhesive may be accelerated by a number of catalysts, for instance, by quaternary ammonium compounds, such as tetramethylammoniumbromide or tetraethylammoniumbromide, benzyltriethylammoniumbromide, phenyltrimethylammoniumbromide, tetrabutylammoniumbromide, diallyldiethylammoniumbromide.

Other suitable accelerators are sulfonium salts, such as a diethylmethylsulfoniumbromide, diphenylmethylsulfoniumbromide or hydroxyphenyldimethylsulfoniumchloride, hydroxynaphthyldimethylsulfoniumbromide, hydroxytoluyldimethylsulfoniumchloride, n - octyl-hydroxyphenyl dimethylsulfoniumchloride. The acceleration of hardening with the aid of sulfonium compounds was heretofore not known.

Other examples of suitable accelerators are pyridin-N-oxide or lead salts of carboxylic acids, for example lead naphthenate, lead oleate or lead abietate.

The adhesive bonds produced in accordance with the process of the present invention, especially adhesive bonds between natural or synthetic rubber and metals, possess excellent resistance against shearing and peeling. They are very stable against chemical attack, for instance, against the continuous action of hot water. A particular advantage of the process according to the present invention resides in that it is possible to join metals with already vulcanized rubber elastomers with the above described adhesive mixtures, whereas the majority of the known metal-rubber adhesives may be employed only in conjunction with simultaneous vulcanization of the rubber.

The following specific examples are given to further illustrate the invention and enable persons skilled in the art to better understand and practice the invention and are not intended to be limitative.

Unless otherwise indicated, the following test objects were used in the tests described in the examples below:

(a) Strips of sheet aluminum having dimensions of 100 x 20 x 2 mm., which were rubbed with emery at the point of application of the adhesive bond and were then degreased with methylene chloride, (b) Strips of vulcanized rubber elastomers which had a tear strength of 25 to 40 kg./cm.$^2$ and dimensions of 100 x 20 x 2 mm.; they were degreased with toluol and roughened with fine sand paper on the adhesive bond surfaces.

These test objects were adhesively bonded with an overlapping area of 10 x 20 mm. During hardening a pressure of 0.05 kg./cm.$^2$ was applied.

Example I

An acid ester was produced from 1 mol of castor oil and 3 mols of phthalic acid anhydride. From this ester an epoxide resin which exhibited an epoxide oxygen content of 2.6% was prepared by reacting the ester with epichlorohydrin in the presence of an ion exchanger in the following manner: an acid ester was produced from 1 mol of castor oil and 3 mols of phthalic acid anhydride. 100 gm. of this product were heated with 900 gm. of epichlorohydrin and 100 gm. of an ion exchanger ("Lewatit MN," water containing, in the form of its free base) for 7 hours under reflux. After cooling, the reaction mixture was separated from the catalyst by filtration. Subsequently, the excess epichlorohydrin was distilled off at a pressure of 40 mm. Hg. Finally, residual epichlorohydrin and dichlorohydrin formed during the reaction are distilled off under a pressure of 0.5 mm. Hg until the internal temperature of the reaction mixture reached 120° C. The yield was 125 gm. This resin has an epoxide oxygen content of 2.7% and a viscosity of 460 centipoises (at 50° C.). 3 g. of this resin and 1.5 g. of dianisidene-diisocyanate were admixed with 2 cc. of ethylacetate at a temperature of 40–50° C. The homogenous mixture was applied in a thin layer to the surfaces of metal and rubber to be bonded. After 20 minutes the areas coated with the adhesive were pressed together and heated for 2 hours at 120° C. under pressure. The adhesive bond produced in this manner exhibited a very good resistance against shearing and peeling.

Example II 3 g. of epoxide resin used in Example I were dissolved at 60° C. in 2.9 g. of a 75% solution of the reaction product of 3 mols of toluylenediisocyanate and 1 mol of trimethylolpropane in ethylacetate. The surfaces of metal and rubber to be adhesively bonded were coated with this solution, and after pressing the two coated surfaces together, the bonded objects were heated for 2 hours under pressure at 120° C. An adhesive bond having a high shearing and peeling resistance was obtained.

Example III 3 g. of the epoxide resin described in Example I were stirred at room temperature with 2.2 g. of dianisidene-diisocyanate, 0.2 g. of maleic acid anhydride and 1 cc. of methylene chloride to form a spreadable paste. A small amount of this paste was applied in a thin layer to the prepared metal and rubber surfaces. After pressing the surfaces together, the test objects were heated for 2 hours under pressure at 120° C. An adhesive bond of such high strength was obtained that the rubber tore apart when it was subjected to a shearing test and also when it was subjected to a peeling test.

5 adhesive test bonds which were produced in accordance with the preceding example and 5 additional test bonds which were produced in the same manner but using only 1.5 g. of dianisidene-diisocyanate were exposed for 240 hours to the effect of distilled water at 70° C. After termination of this test, no change in the shearing and peeling resistance of the metal-rubber bonds could be determined.

Example IV 3 g. of epoxide resin described in Example I, 1.5 g. of dianisidene-diisocyanate, 3 cc. of xylene and 0.1 g. of hydroxyphenyldimethylsulfonium chloride were stirred into homogeneous mixture. Examples of these mixtures were applied in a thin layer to the surface to be bonded. After pressing the surfaces together, heating at 100° C. under pressure for 1 hour was sufficient to produce very hard adhesive layers which resulted in a rubber-metal bond with high strength.

Example V

An acid ester was produced from 1 mol of dimerized fatty alcohol (produced by dimerization of unsaturated fatty acids having a chain length of $C_{18}$ and subsequent filtration) and 2 mols of phthalic acid anhydride in known fashion. An epoxide resin having an epoxide oxygen content of 2.65% was produced from this acid ester by reaction with epichlorohydrin in the presence of an ion exchanger, generally pursuant to the process described in Example I. 3 g. of this epoxide resin were stirred into 2.2 g. of dianisidene-diisocyanate and 2 cc. of xylene. The prepared rubber and metal strips were coated with a small amount of this mixture. After allowing the solvent to evaporate, the coated surfaces were pressed together and the joined objects were heated under pressure for 2 hours at 120° C. Rubber-metal bonds of particularly high shearing strength were obtained.

Example VI

An epoxide resin was prepared by reaction of dimeric fatty acids with epichlorohydrin in the presence of an ion exchanger in the following manner: 100 gm. of a dimerized fatty acid (the commercial product, "Emery 3065-S") were heated with 1800 gm. of epichlorohydrin and 100 gm. of an anion exchanger ("Lewatit MN," water containing, in the form of its hydrochloric acid salt) for 7 hours under reflux. The reaction mixture was worked up as described in Example I. 120 gm. of an epoxide resin with an epoxide oxygen content of 3.9% were obtained. 3 g. of this resin, 2.65 g. of dianisidene-diisocyanate and 2.5–3 cc. of xylene were admixed with each other at 50° C. A homogenous solution was formed. This solution was applied in a thin layer to the surfaces to be adhesively bonded. After 20 minutes the test strips were pressed together and heated under pressure for 2 hours at 120° C. A rubber-metal bond with very good shearing and peeling resistance was obtained.

Example VII 3 g. of the epoxide resin used in Example I were stirred with 2.2 g. of dianisidene-diisocyanate, 0.2 g. of maleic acid anhydride and 0.52 g. of commerical finely divided carbon black (High Abrasion Furnace, hereinafter designated as HAF-carbon black) to form a thin liquid paste. The prepared test strips were then coated with a thin layer of this paste, thereafter pressed together and heated under pressure for 2 hours at 120° C. The adhesive bond then exhibited such a high strength that the rubber broke upon subjecting it to a tensile as well as a peeling test.

Example VIII 3 g. of the epoxide resin described in Example VI, 1.56 g. of toluylene-diisocyanate, 0.2 g. of maleic acid anhydride and 0.46 g. of HAF-carbon black were stirred together to form a homogenous mixture. When this mixture was used as described in Example VII, the rubber also broke in the vicinity of the adhesive bond when it was subjected to a tensile and a peeling test.

Example IX

An epoxide resin having an epoxide oxygen content of 4.4% was produced by reaction of an acid ester prepared from triethyleneglycol and phthalic acid anhydride in a molar ratio of 1:2 and epichlorohydrin in the presence of an ion exchanger 446 gm. of an acid ester produced by reaction of triethyleneglycol and o-phthalic acid anhydride in a molar ratio of 1:2 gm. of a commercial, water-containing anion exchanger resin ("Lewatit MN" in the form of its acetic acid salt). The reaction mixture was worked up in the manner described in Example I. 665 gm. of an epoxide resin having the following characteristic values were obtained:

Epoxide oxygen content, percent ---------------- 4.4
Chlorine, percent ---------------------------- 4.5
Viscosity at 50° C., cp. ---------------------- 790

Color according to Lovibond (1″ dish) : 2.0 yellow, 0.5 red (diluted with acetone in a ratio of 1:1).

3 g. of this resin were admixed with 2.15 g. of toluylene-diisocyanate, 0.2 g. of maleic acid anhydride and 0.52 g. HAF-carbon black to form a suspension. When this adhesive was used in the manner described in Example VII, rubber-to-metal bonds were obtained which separated only at high peeling and tensile loads, accompanied by tearing of the rubber surface.

Example X

An epoxide resin having an epoxide oxygen content of 4.2% was prepared by reaction of an acid ester formed from triethyleneglycol with 2 mols of adipic acid anhydride and epichlorohydrin in the presence of an ion exchanger. An acid ester was produced from 1 mol of triethylene glycol and 2 mols of adipic acid (polymer). 102 gm. of this ester were heated with 150 gm. of an anion exchanger ("Lewatit MN" water containing, in the form of its free base), and 1850 gm. of epichlorohydrin for 7 hours under reflux. The reaction mixture was worked up as described in Example I. 125 gm. of an epoxide resin with an epoxide oxygen content of 4.18% were obtained. This resin exhibited an unusually low viscosity of 70 centipoises at 50° C. It is, therefore, suitable for diluting other epoxide resins and simultaneously imparts improved elastic properties to such other epoxide resins. 3 g. of this resin were stirred with 2.05 g. of toluylene-diisocyanate, 0.2 g. of maleic acid anhydride and 0.5 g. of HAF-carbon black to form a suspension. When this adhesive mixture was used in the same manner as in Example VII, breaking of the rubber but not on the adhesive layer was again observed upon subjecting this bond to tensile as well as peeling tests.

A strip of sheet steel was adhesively bonded with the same adhesive to a natural rubber-styrene-butadiene-elastomer. The tensile strength of this adhesive bond upon being subjected to a peeling test (ASTM-Test No. D 429–56–T, Method B) at an angle of 45° was 42 kg./inch. Upon bonding a strip of sheet steel with a neoprene elastomer, a tensile strength of 60 kg./inch was obtained under the same conditions.

Example XI 3 g. of the epoxide resin described in Example X, 3.48 g. of dianisidene-diisocyanate, 0.2 g. of maleic acid anhydride and 0.65 g. of HAF-carbon black were stirred with 4 cc. of xylene to form a mobile fluid suspension. Upon adhesively bonding rubber to aluminum or iron with the aid of this adhesive, bonds of such high strength were obtained that a smooth break of the rubber occurred when the bond was subjected to tensile and peeling tests.

Under the same conditions, sheet steel was adhesively bonded to natural rubber, styrene and butadiene elastomers. When subjected to a peeling test (ASTM-Test No. D 429–56–T, Method B) at an angle of 45°, the adhesive bonds exhibited a tensile strength of 44 kg./inch. Adhesive bonds of steel to neoprene elastomers exhibited a tensile strength of 55 kg./inch under the same conditions.

Example XII 3 g. of the epoxide resin described in Example I were stirred with 2.6 g. of 4,4′-diphenylmethane-diisocyanate, 0.2 g. of maleic acid anhydride, 0.56 g. of HAF-carbon black and 3 cc. of xylene to form a suspension. The surfaces of metal and rubber to be bonded were coated with this suspension, and after pressing them together, were heated for 2 hours at 120° C. A metal-to-rubber bond of especially high tensile and peeling strength was obtained.

Example XIII 3 g. of the epoxide resin described in Example VI were stirred with 12.8 g. of a 20% solution of 4,4',4''-triphenylmethanetriisocyanate in methylenechloride, 0.2 g. of maleic acid anhydride and 0.55 g. of HAF-carbon black to form a homogenous mixture. The adhesive mixture thus formed was applied in thin layers to the test objects. After allowing the solvent to evaporate, pressing the surfaces together and hardening the adhesive for 2 hours at 120° C., rubber-to-metal bonds with high strength were obtained.

Example XIV

A commercial polyester with terminal hydroxyl groups, which was prepared from adipic acid and ethylene glycol and had a molecular weight of about 2000, was first reacted by known methods with 1 mol of adipic acid anhydride per OH-equivalent. The polyester with terminal carboxyl groups obtained in this manner was transformed into an epoxide resin by 6 hours of boiling with 20 times its weight of epichlorohydrin in the presence of an ion exchanger generally following the method of Example I; the epoxide resin had an epoxide oxygen content of 1.32%. 3 g. of this resin were stirred with 1.11 g. of dianisidene-diisocyanate, 0.2 g. of maleic acid anhydride, 0.4 g. of HAF-carbon black and 1 cc. of xylene to form a paste. This paste was applied in thin layers to the surfaces to be adhesively bonded. After allowing the solvent to evaporate, pressing the surfaces together and hardening the bond for 2 hours at 120° C., rubber-to-metal bonds were again obtained which exhibited very good tensile strengths.

Example XV

An ester with terminal hydroxyl groups was produced in known fashion from 1 mol of adipic acid and 2 mols of thiodiglycol, and this ester was subsequently subjected to an additional reaction with 2 mols of adipic acid anhydride. The ester dicarboxylic acid obtained in this manner was transformed into an epoxide resin by reaction with 20 times its weight of epichlorohydrin in the presence of an ion exchanger generally pursuant to the process described in Example I; the epoxide resin had an epoxide oxygen content of 3.3%. 3 g. of this resin were stirred with 2.75 g. of dianisidene-diisocyanate, 0.2 g. of maleic acid anhydride, 0.6 g. of HAF-carbon black and 0.5 cc. of xylene to form a suspension. The surfaces to be adhesively bonded were coated with this mixture, and 20 minutes after coating the surfaces were pressed together. Thereafter, the adhesive bond was hardened for 20 minutes at 160° C. The rubber-to-metal bond thus obtained again exhibited a high tensile and peeling strength.

Example XVI

An epoxide resin having an epoxide oxygen content of 7% was prepared by reaction of adipic acid and epichlorohydrin in the presence of an ion exchanger according to either of the following methods: 202 gm. of sebacic acid were refluxed for 7 hours with 200 gm. of a commercial, water-containing anion exchanger resin ("Lewatit MN," in the form of the free base) and 3700 gm. of epichlorohydrin. The reaction mixture was worked up in the same manner as described in Example I. 330 gm. of a light colored, thin liquid resin were obtained which partially crystallized after being allowed to stand for some time and had the following characteristic values:

| | Percent |
|---|---|
| Epoxide oxygen content | 6.7 |
| Chlorine | 5.3 |

Color according to Lovibond (1" dish) : 0.1 yellow, 0.0 red (diluted with acetone in a ratio of 1:1).

118 gm. of succinic acid were refluxed for 7 hours with 200 gm. of a commercial, water containing anion exchanger resin ("Lewatit MN" in the form of its hydrochloric acid salt) and 3700 gm. of epichlorohydrin. The reaction mixture was worked up in the manner described in Example I. 240 gm. of an epoxide resin having the following characteristic values were obtained:

| | |
|---|---|
| Epoxide oxygen content, percent | 8.2 |
| Chlorine, percent | 9.4 |
| Viscosity at 50° C., cp. | 68 |

Color according to Lovibond (1" dish) : 0.6 yellow, 0.1 red (diluted with acetone in a ratio of 1:1).

3 g. of either of these resins were stirred with 5.8 g. of dianisidene-diisocyanate, 0.2 g. of maleic acid anhydride, 0.88 g. of HAF-carbon black and 2 cc. of xylene to form a suspension. When the adhesive composition prepared was employed in the manner described in Example XV, rubber-to-metal bonds of such high strength were obtained that the rubber broke upon subjecting the bond to tensile as well as peeling tests.

I claim:
1. A composition for forming an adhesive bond between elastomers and metals consisting essentially of an admixture of (1) organic isocyanate compounds containing more than one isocyanate group selected from the group consisting of dianisidene-diisocyanate, toluylene-diisocyanate, diphenylmethane - diisocyanate, triphenyl-methane-triisocyanate and diphenylene-diisocyanate, and (2) epoxide compounds having more than one epoxide group in the molecule prepared by esterifying epichlorohydrin with acid polyesters containing more than one free carboxyl group in the molecule and a molecular weight of up to 2000, wherein the ratio of epoxide groups to isocyanate groups in the composition is between 1:1 and 1:5.

2. The composition of claim 1 wherein the ratio of epoxide groups is isocyanate groups in the composition is about 1:3.

3. The composition of claim 1 containing from about 1 to 10 percent of carbon black.

4. The composition of claim 1 containing from about 1 to 10 percent of maleic acid anhydride.

5. A method for forming an adhesive bond between elastomers and metals which comprises applying to the surfaces to be bonded an adhesive composition comprising an admixture of (1) organic isocyanate compounds containing more than one isocyanate group selected from the group consisting of dianisidene-diisocyanate, toluylene-diisocyanate, diphenylmethane-diisocyanate, triphenyl-methane-triisocyanate and diphenylene-diisocyanate, and (2) epoxide compounds having more than one epoxide group in the molecule prepared by esterifying epichlorohydrin with acid polyesters containing more than one free carboxyl group in the molecule and a molecular weight of up to 2000, wherein the ratio of epoxide groups to isocyanate groups in the composition is between 1:1 and 1:5, joining said surfaces, and subjecting said surfaces to an elevated temperature between about 60° C. and 180° C.

6. The method of claim 5 wherein the ratio of epoxide groups to isocyanate groups in the composition is about 1:3.

7. The method of claim 5 wherein said composition contains from about 1 to 10 percent of carbon black.

8. The method of claim 5 wherein said composition contains from about 1 to 10 percent of maleic acid anhydride.

9. A method for forming an adhesive bond between elastomers and metals which comprises applying to the surfaces to be bonded an adhesive composition comprising an admixture of (1) organic isocyanate compounds containing more than one isocyanate group selected from the group consisting of dianisidene-diisocyanate, toluylene-diisocyanate, diphenylmethane-diisocyanate, triphenyl-methane-triisocyanate and diphenylene-diisocyanate, and (2) epoxide compounds having more than one epoxide group in the molecule prepared by esterifying epichlorohydrin with acid polyesters containing more than one free carboxyl group in the molecule and a molecular weight of up to 2000, wherein the ratio of epoxide groups to isocyanate groups in the composition is between 1:1 and 1:5, and (3) an inert organic solvent, joining said surfaces, and subjecting said surfaces to an elevated temperature between about 60° C. and 180° C.

10. A method for forming an adhesive bond between elastomers and metals which comprises applying to the surfaces to be bonded an adhesive composition comprising an admixture of (1) organic isocyanate compounds containing more than one isocyanate group selected from the group consisting of dianisidene-diisocyanate, toluylene-diisocyanate, diphenylmethane-diisocyanate, triphenyl-methane-triisocyanate and diphenylene-diisocyanate, (2) epoxide compounds having more than one epoxide group in the molecule prepared by esterifying epichlorohydrin with acid polyesters containing more than one free carboxyl group in the molecule and a molecular weight of up to 2000, wherein the ratio of epoxide groups to isocyanate groups in the composition is between 1:1 and 1:5, and (3) a hardening accelerator selected from the group consisting of ammonium and sulfonium compounds, joining said surfaces, and subjecting said surfaces to an elevated temperature between about 60° C. and 180° C.

References Cited

UNITED STATES PATENTS

| | | |
|---|---|---|
| 2,872,427 | 2/1959 | Schroeder. |
| 2,905,582 | 9/1959 | Coleman et al. |
| 3,032,460 | 5/1962 | Chipman et al. _____ 156—330 |
| 3,048,552 | 8/1962 | Fang _____ 260—45.4 |
| 3,100,756 | 8/1963 | Fry _____ 260—42 |
| 3,158,586 | 11/1964 | Krause _____ 260—830 |
| 3,307,966 | 3/1967 | Shoaf _____ 161—184 |

OTHER REFERENCES

Raecke et al.: German application 1,030,325, printed May 22, 1958 (Kl 12 o 11), 3 pp. spec.

Raecke et al.: German application 1,030,824 (Kl 12 o 11), 2 pp. spec. no dwg.

ROBERT F. BURNETT, *Primary Examiner.*

WILLIAM J. VAN BALEN, *Assistant Examiner.*

U.S. Cl. X.R.

117—75; 161—184, 186, 190; 260—830